Sept. 20, 1949.   F. W. GODSEY, JR   2,482,477
ELECTRICAL TORQUE MEASURING DEVICE
Filed Aug. 10, 1944   2 Sheets-Sheet 1
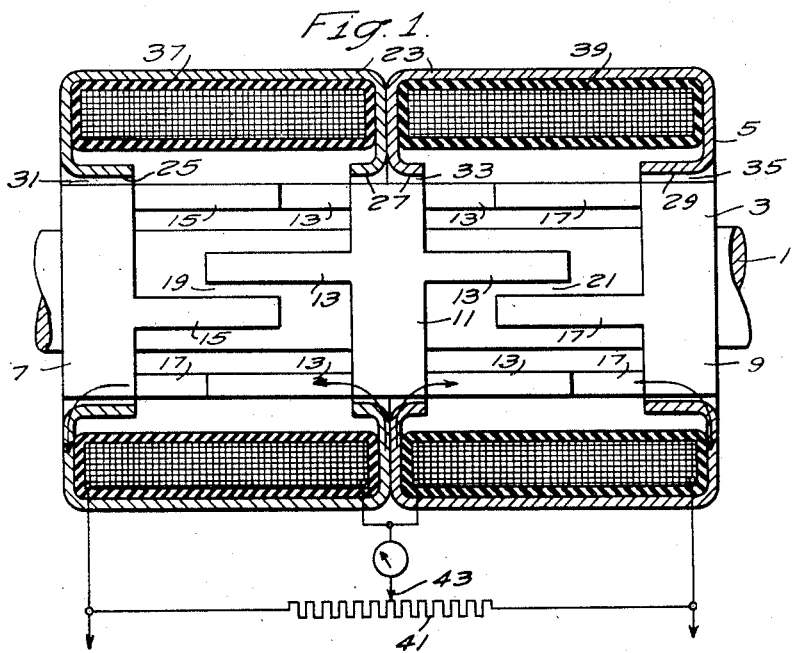
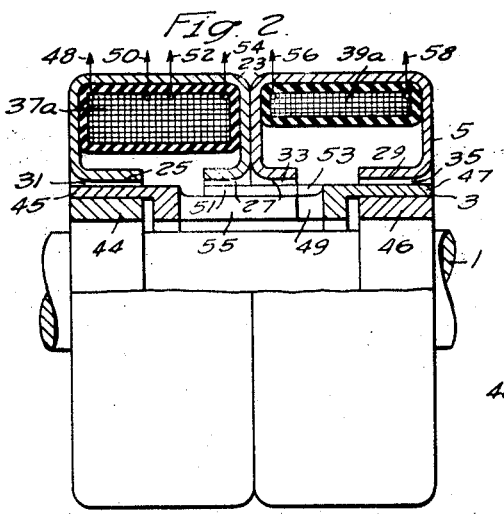
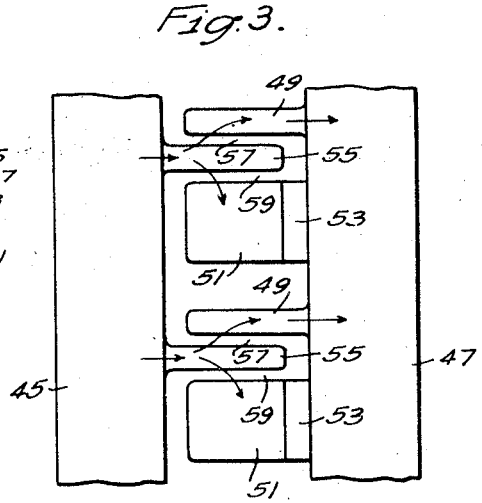
WITNESSES:
INVENTOR
Frank W. Godsey, Jr.
BY
Paul E. Friedemann
ATTORNEY Sept. 20, 1949.   F. W. GODSEY, JR   2,482,477
ELECTRICAL TORQUE MEASURING DEVICE
Filed Aug. 10, 1944   2 Sheets-Sheet 2
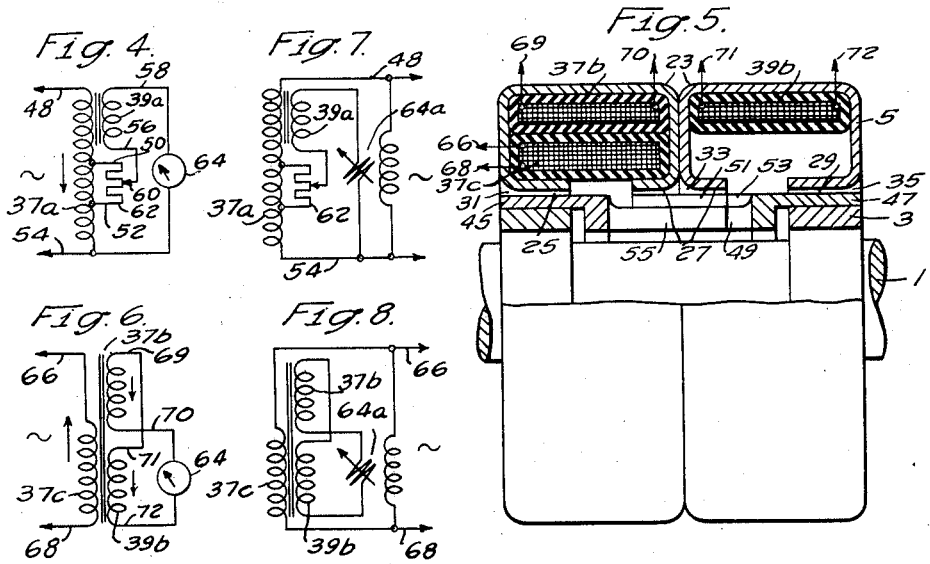
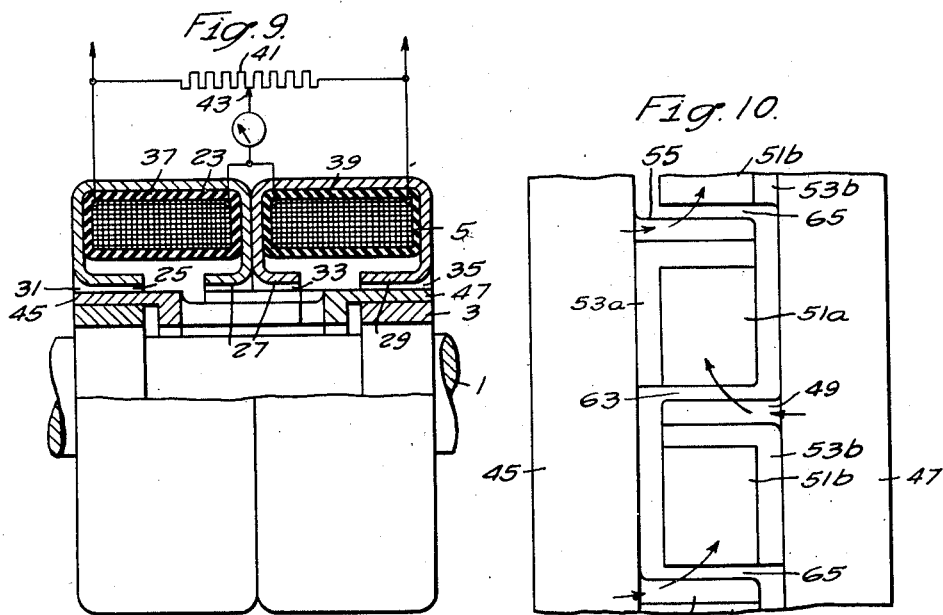
WITNESSES:
E. A. McCloskey
C. L. Oberheim
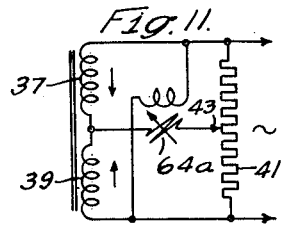
INVENTOR
Frank W. Godsey, Jr.
BY
Paul E. Friedemann
ATTORNEY Patented Sept. 20, 1949

2,482,477

UNITED STATES PATENT OFFICE 2,482,477

ELECTRICAL TORQUE MEASURING DEVICE

Frank W. Godsey, Jr., Mount Lebanon, Pa., assignor to Westinghouse Electric Corporation, East Pittsburgh, Pa., a corporation of Pennsylvania Application August 10, 1944, Serial No. 548,851

12 Claims. (Cl. 73—136)

1

This invention relates generally to electrical strain-sensitive devices. More particularly this invention relates to electromagnetic devices for sensing or responding to mechanical strain, which embody relatively movable elements which follow or are relatively displaced according to the strain of the test specimen or object and which change the flux linkages of the elements comprising the strain-sensitive electromagnetic device, to produce an electrical quantity indicative of the strain.

This invention is closely related to a copending application of Frank W. Godsey, Jr., Serial No. 455,258, filed August 18, 1942, and entitled, "Power measuring device for rotating shafts," now abandoned, and also to a copending application of Bernard F. Langer and Frank W. Godsey, Jr., Serial No. 458,378, filed September 15, 1942, and entitled "Torque measuring devices for shafts," which matured into Patent No. 2,459,171 on January 13, 1949. In certain of its aspects this invention represents an improvement over the invention disclosed in the above-mentioned copending applications.

A principal object of this invention is to provide strain-sensitive devices that will respond to the mechanical strain characteristics of a shaft and produce an electrical quantity indicative of or proportional to the aforenamed characteristics.

Another object of the present invention is to provide a strain-sensitive device for a rotatable shaft that will eliminate the use of slip rings and brushes.

Another object of the present invention is to provide a torque measuring device of such mechanical design as to be self-compensating for relative changes of position of the component parts due to temperature changes, end thrusts of the shaft, and bending of the shaft, the torque loading of which is to be measured.

A specific object of the present invention is to provide a torque measuring device that will respond to slight circumferential or torsional deflections, that is, twist, of small gauge lengths of shafts.

A further specific object of the present invention is to provide a torque measuring device of compact construction and particularly of small axial dimension that will be adaptable for use in relatively small spaces and with short shaft lengths.

A still further specific object of the present invention is to provide a torque measuring device of balanced construction that it may operate

2 at high speeds without introducing vibrations in the given shaft or shaft system.

Other objects and advantages will become more apparent from a study of the following specification when considered in conjunction with the accompanying drawings, in which:

Figure 1 is a longitudinal sectional view of a torque measuring device of the type illustrated in the aforenamed copending application of Bernard F. Langer and Frank W. Godsey, Jr.

Fig. 2 is a fragmentary sectional view taken in a longitudinal direction of a torque measuring device embodying the fundamental principles of this invention.

Fig. 3 is a development of the rotor construction of the invention illustrated in Fig. 2.

Fig. 4 diagrammatically illustrates the metering circuit for the device illustrated in Fig. 2.

Fig. 5 is a fragmentary sectional view taken in a longitudinal direction illustrating a modified form of stator construction.

Fig. 6 diagrammatically illustrates the metering circuit for the device shown in Fig. 5.

Fig. 7 diagrammatically illustrates a modified metering circuit for the device of Fig. 2.

Fig. 8 diagrammatically illustrates a modified metering circuit for the device of Fig. 5.

Fig. 9 is a modification of the devices illustrated in Figs. 2, 3 and 5.

Fig. 10 is a development of the rotor construction of the device of Fig. 9, and

Fig. 11 diagrammatically illustrates a modified metering circuit for the device of Fig. 9.

Broadly stated this invention comprises a rotor assembly secured to rotate with the shaft, the strain of which is to be determined, and a stationary member including a plurality of windings, which is in flux linkage with the rotor assembly. A plurality of relatively movable elements forming a part of the rotor assembly and which are relatively displaced when the shaft is strained in torsion, alter the distribution of the magnetic flux circulating in the device to thus produce a change in the electrical properties of the windings in an amount indicative of the shaft strain in torsion.

The type of strain gauge or torque-sensitive device illustrated in Fig. 1 is described in detail in the copending application of B. F. Langer and F. W. Godsey, Jr., hereinbefore mentioned. However, it is believed that the improvements provided by the present invention will be more readily appreciated once an understanding of the construction and operation of the device of Fig. 1 is had, since, in fundamental principle the devices are similar. Specifically, it will be more readily appreciated how a more compact construction is achieved without any loss in sensitivity by the devices of this invention.

Referring now to Fig. 1 of the drawing the numeral 1 denotes a shaft, the power output of which is to be measured. Numeral 3 denotes a rotor assembly secured to rotate with the shaft and which, in effect, forms the armature member of the strain gauge, and numeral 5 denotes an annular stationary member which is concentrically positioned about the shaft and which, in effect, forms the core assembly of the strain gauge.

The rotor assembly 3 comprises a pair of axially spaced torque rings 7 and 9 secured to the shaft over bushings (not shown) of non-magnetic material so that a circulating magnetic flux will not include the shaft if the shaft is made of steel or other magnetic material. Centrally disposed between the axially spaced rings 7 and 9 is a third ring 11 termed, "a reference ring," likewise supported and secured to the shaft on a bushing (not shown) of non-magnetic material. The three rings thus secured to the shaft are so axially spaced and supported that a known gauge length of shaft is included therebetween. The reference ring 11 has secured thereto a plurality of axially extending fingers or projections 13 which extend axially on each side of the reference ring in the same axial plane. Each of the torque rings 7 and 9 has respectively a plurality of axially extending fingers or projections 15 and 17, which are of sufficient length to overlap the extremities of the fingers 13 associated with the reference ring 11. The confronting faces of each of the cooperating fingers or projections of the three shaft rings are so positioned that a small circumferential airgap is included therebetween, and the above-described assembly is such that, for example, if torque were to be transmitted from left to right of the shaft as viewed in the drawing in a clockwise direction, tersional deflections of the shaft between the torque ring 7 and the reference ring 11 would so displace the finger 15, relative to the finger 13 cooperating therewith, that the circumferential airgap 19 formed therebetween would be increased and the torsional deflections of the shaft between the reference ring 11 and the torque ring 9 would so displace the finger 17 relative to the finger 13, cooperating therewith that the circumferential airgap 21 formed therebetween would be decreased.

The stationary member 5 comprises an outer annular shell or housing 23 formed in two abutting sections, each provided with flanged extremities forming the peripheral surfaces 25, 27 and 29 which are respectively positioned in proximity to the shaft rings 7, 11 and 9. The inner diameters of the peripheral surfaces are such that small annular airgaps 31, 33 and 35 are formed between the surfaces of the concentrically positioned confronting faces. Included within the sections of the annular housing is a pair of annular coils 37 and 39 which are each connected in adjacent legs of a conventional electrical bridge circuit which has for each of its other two legs half of the potentiometer 41.

It will now be seen that if a constant source of alternating current were to be applied across the input terminals of the bridge circuit, a flow of alternating magnetic flux may be caused to flow in the stationary member 5 and the rotor assembly 3 in the instantaneous directions indicated by the arrows. For zero torque of the shaft, the bridge circuit may be adjusted to a balanced condition by movement of the potentiometer slider 43 across the potentiometer 41. Upon torsional deflection of the shaft, assuming clockwise torque from left to right of the shaft as previously described, the airgaps 19 will be increased, while the airgaps 21 will be decreased to substantially proportionally change the values of the alternating magnetic fluxes associated with each of the coils. The alternating magnetic flux associated with one coil being decreased while the alternating magnetic flux associated with the other coil is increased; that in effect, the impedances of the coils are changed, one decreasing and the other increasing, thereby electrically unbalancing the bridge circuit and causing an electrical quantity proportional to the torque of the shaft to appear across the output terminals of the bridge circuit. This electrical quantity is conveniently measured with any suitable type of of indicating or recording instrument, which may be calibrated to read in pound feet.

The fundamental principles of the device illustrated in Fig. 1 and those of the remaining figures of the drawing illustrating the preferred embodiments of the invention are analogous. There are, however, physical differences in the rotor assembly and as follows, in some of the embodiments, changes in the magnetic circuits in general, and it is primarily in these differences that the present invention resides. The various figures illustrating the present invention have been drawn substantially to the same scale as the device of Fig. 1 for the purpose of showing in the drawing, the reduction in the axial length of the device achieved by the present invention. For all practical purposes the devices of, for example, Fig. 1 and Fig. 2 may be considered as having the same capacity, thus, for example, the device of Fig. 2 with half the gauge length of that of Fig. 1 provides an electrical change for the same shaft strain which is at least equal in magnitude to the electrical change produced by the device of Fig. 1.

In general, the embodiment of the invention illustrated in Figs. 2 and 3 again comprises the shaft 1, having securely mounted thereon the rotor assembly 3 and the stationary member or stator 5 concentrically disposed with respect to the rotor assembly. Specifically the rotor assembly comprises the two torque rings 45 and 47 which are respectively mounted upon the non-magnetic bushings 44 and 46. Projecting from the torque ring 47 is a projection or finger member 49, as will be more clearly seen in the developed view of the rotor in Fig. 3. Circumferentially displaced from the finger 49 is a segment 51 which is preferably a ring segment, the outside diameter of which is the same, although not necessarily so, as that of the torque rings 45 and 47. This ring segment is securely mounted to the torque ring 47 by means of a non-magnetic spacer 53. A finger member 55 projects from the torque ring 45 between the finger member 49 and the ring segment 51. This assembly is such that circumferential airgaps 57 and 59 having similar magnetic characteristics are formed therebetween. A suitable number of these fingers and segment assemblies continues around the periphery of the torque rings. It will be understood that one of such finger and segment assemblies is sufficient to achieve the necessary magnetic flux changes; however, for the purpose of mechanically balancing the rotor assembly and possibly increasing the flux capacity of the device and at the same time effecting a better flux distribution, a plurality of these assemblies is probably desirable.

The stationary member 5 again comprises the magnetic housing 23 which is formed in two sections and provided with the flanged extremities 25, 27 and 29 which form, with the cooperating peripheral surfaces of the torque rings 45 and 47 and the ring segments 51 of the rotor assembly, the airgaps 31, 33 and 35, having stable magnetic characteristics whether the rotor is rotating or stationary. A main winding 37a is provided in the lefthand section of the magnetic housing as viewed in the drawing, and a second winding 39a is provided in the righthand section. These windings may be connected in a suitable circuit such as, for example, that illustrated in Fig. 4 in which the coil leads 48 and 54 of the main winding 37a are connected across a source of alternating current. The leads 50 and 52 of the main winding 37a have connected thereacross a resistor element 62 which is provided with a slider such as 60. The slider 60 is connected to the coil lead 56. The coil lead 58 is connected to one side of the indicating instrument, the other side of which is connected to the lead 54. With this arrangement, a tapped portion of the main winding 37a is connected in series with the winding 39a and a suitable indicating instrument, such as 64, is utilized to measure the electrical unbalance of the coils.

The magnetic circuit of this device, as will be apparent from Fig. 3, has two paths through the rotor and through the stator. One of these paths, referring now to Figs. 2 and 3, begins with the left section of the magnetic housing and includes the airgap 31, the torque ring 45, the finger member 55, the airgap 57, the finger member 49, the torque ring 47, the airgap 35 to the righthand section of the housing and thence through the abutting surfaces of the housing to the lefthand housing section. The other path begins again with the lefthand housing section, the airgap 31, the torque ring 45, the finger member 55, the ring segment 51, the airgap 33 to the other side of the lefthand housing section.

Thus it will be seen that upon torsional deflection of the shaft due to clockwise torque from left to right of the shaft, the airgaps 57 are increased while at the same time the airgaps 59 are decreased. This unbalances the magnetic fluxes in the parallel magnetic circuits. The magnetic fluxes linking the main winding 37a increasing and the magnetic fluxes linking the winding 39a decreasing; thus, in effect, the impedance of the winding 37a increases while, in effect, the impedance of the winding 39a decreases.

It will be apparent from the metering circuit illustrated in Fig. 4 that the voltages induced by the inductive coupling of the windings in the winding 39a are 180° out of phase with the voltages of the main winding 37a, by reason of the fact that the winding 39a is inductively energized by the winding 37a. Thus when these windings are connected as shown in series, the voltages of the metering circuit are in opposition. For zero torque of the shaft these voltages may be made exactly equal in value and at the same time the coil impedances matched by adjustment of the resistor slider along the resistor element 62. Thus at zero torque of the shaft the total voltage of the metering circuit is zero and hence no indication appears on the indicating instrument. For the assumed condition of torque transmission, however, and the corresponding impedance unbalance of the coils that follows, the opposed voltages are no longer the same. As a result, an indication appears on the indication instrument which is indicative of the torque being transmitted by the shaft.

There are, of course, many types of indicating instruments which may be employed to determine the electrical change produced by torque. Fig. 7 illustrates the use of a preferred type of indicating instrument having electrical characteristics which contribute to producing a well stabilized torque sensitive or responsive system. The instrument 64a therein schematically illustrated is of the dynamometer type and may, for example, comprise a coil and magnetic circuit system of the nature employed in a standard wattmeter. Preferably, such an instrument should have an arcuate core structure subtending an angle of about 270° and encircled by the moving coil, which coil is so pivoted at the center of the arc that it may traverse the entire length of the arcuate core. This produces what is commonly known as a "long scale" instrument. This arcuate core has a radially extending portion which joins the magnetic circuit encircling the arcuate core. The stationary winding usually encircles the radially extending portion. Instruments having such core structures are well known. It is preferred, however, that such an instrument be used without the usual biasing springs which return the instrument pointer to zero when the instrument is disconnected from the circuit. With this arrangement the instrument's moving coil assumes a position such that the average induced voltages and the average conducted voltages are balanced. The current, however, is supplied to the moving coil element of the instrument in the usual manner which ordinarily is through the medium of dead soft spirally wound conductors (not shown). In the ideal case such conductors do not mechanically bias the coil. When such an instrument is employed, the moving coil may be connected, as shown, in series with the windings of the strain-sensitive device to thus be energized by the unbalanced electrical quantities of these windings. The stationary winding is connected to the source of alternating current which energizes the system. When an unbalance of the winding electrical quantities occurs, the moving coil is energized by the differential thereof. This produces magnetomotive forces acting on the moving coil assembly which cause the coil to rotate until it reaches a position in which these forces are balanced against the magnetomotive forces resulting from the induced electrical quantities. The scale deflection of the instrument at this point is indicative of the torque transmitted by the shaft.

The essential difference existing between the devices of Figs. 2 and 5 resides in the stator assembly. The rotor assembly of Fig. 5 is the same as that illustrated in Fig. 3, thus the discussion of the magnetic circuits made in connection with the device illustrated in Fig. 2 applies equally to this device of Fig. 5.

Referring more particularly now to Fig. 5 the stationary member 5 comprises the two preferably identical windings 37b and 39b and an exciting winding 37c which is disposed with the coil 37b in the lefthand section of the housing. Energization of the winding 37c with alternating current induces in phase voltages in the windings 37b and 39b. The metering circuit for this coil arrangement is illustrated in Fig. 6. Here the exciting winding 37c has its leads 66 and 68 connected across a suitable source of alternating current. The lead 69 of the winding 37b is connected to the lead 71 of the winding 39b and the leads 70 and 72, respectively, of the windings 37b and 39b are connected across an indicating instrument 64. With this winding arrangement the windings 37b and 39b are in effect secondary windings of a transformer having for its primary winding the windings 37c. Instantaneous relations of the voltages of the primary and secondary windings are indicated in Fig. 6. Thus it will be seen that by connecting the respective coil leads as indicated, the instantaneous voltages of the metering circuit are in opposition. For zero torque of the shaft, the voltages of the windings 37b and 39b are identical in value. Hence the current flowing through the indicating instrument is zero. However, when the magnetic circuits are unbalanced as discussed in connection with Fig. 2 an impedance or electrical unbalance of the coils 37b and 39b occurs. As a result, the electrical quantities or voltages of these coils change and the differential of these electrical quantities energizes the indicating instrument.

Fig. 8 illustrates the same type of metering circuit as shown in Fig. 6 but utilizes a dynamometer type of instrument 64a described in connection with Fig. 7. The moving coil of this instrument is preferably energized by the differential of the electrical quantities of the windings 37b and 39b, while the stationary coil is connected across the source of alternating current.

The modification of the invention illustrated in Figs. 9 and 10 again utilizes the ring segments and finger members in the rotor assembly. The arrangement of these elements, however, is of such a nature that a stator construction functioning similar to that of Fig. 1 may be obtained and, as a result, a conventional bridge circuit may be utilized as in Fig. 1 to determine the change in electrical properties of the two windings. This device again generally comprises the shaft 1, the rotor assembly 3 securely mounted upon the shaft and the stationary member or stator 5.

The rotor assembly 3 has its two torque rings 45 and 47 fastened in the same manner to the shaft as the assembly of Fig. 2. Finger members 55 project axially from the torque ring 45 at spaced circumferential distances. Likewise, finger members 49 project axially from the torque ring 47 at spaced circumferential distances. The ring segments 51a are non-magnetically secured to the torque ring 45 by means of non-magnetic spacers 53a. The ring segments 51b are non-magnetically secured to the torque ring 47 also by means of non-magnetic spacers 53b. Each ring segment has a surface thereof disposed in confronting relationship with a finger member carried by the opposite ring, such that small circumferential airgaps are formed therebetween. The alternate supporting of the ring segments 51a and 51b and likewise the finger members 55 and 49 provides the plurality of circumferential airgaps 63 and 65 and the assembly is such that for clockwise torque from left to right of the shaft, the airgaps 63 are decreased while the airgaps 65 are increased.

The magnetic circuit for this device may be traced from the left housing section across the airgap 31 to the torque ring 45, a finger member 55 projecting from the torque ring 45, an airgap 65 to a ring segment 51b and thence across the airgap 33 to the other side of the left housing section. The other magnetic circuit may be traced from the right housing section across the airgap 35 to the torque ring 47, a finger member 49 projecting therefrom, an airgap 63 to a ring segment 51a and thence across the airgap 33 to the other side of the righthand section of the housing. Since the respective magnetic circuits traced include airgaps which change in opposite direction, for example, the first-traced magnetic circuit includes the rotor airgaps 65 and the second-traced magnetic circuit includes the airgaps 63, it will be apparent that when the shaft is strained in torsion that the reluctance of these magnetic circuits change in opposite directions and, as a result, the impedances of the windings 37 and 39 change in opposite directions. Since, as shown, these windings are connected in adjacent legs of a conventional bridge circuit which is electrically balanced for zero torque of the shaft, the electrical quantity appearing across the output terminals of the bridge circuit when the shaft is strained is indicative of the torque being transmitted by the shaft.

Fig. 11 illustrates a modification of the metering circuit shown in Fig. 9. This circuit differs only in the use of a dynamometer type of indicating instrument 64a such as that shown, for example, in Fig. 7 and Fig. 8. Here the moving coil is connected across the galvanometer terminals of the bridge circuit and, hence, is energized by the differential of the electrical quantities of the windings 37 and 39. The stationary coil is connected across the source of alternating current.

It will be noted that the two types of rotor construction disclosed herein, in a manner similar to that of Fig. 1, provide compensation for unwanted electrical changes resulting from dimensional changes unrelated to torque. End thrust, which causes greater or lesser overlapping of the fingers or segments of the two ring elements depending upon the direction of the thrust, causes dimensional shifts in the confronting faces of both sets of airgaps in the same direction. Thus, the coil impedances change in the same direction. For the circuit connections in Figs. 4, 6, 7 and 8, the opposed voltages in the metering circuit change in like amounts due to the like impedance changes in the opposed coils. For the bridge circuit of Fig. 11 the parallel impedance paths change in like amounts. Hence, no change in potential at the terminals of the moving coil of the meter results from this source. Similarly shaft bending, which causes relative tilting of the fingers or segments, equally effects both sets of airgaps, and impedance changes which may occur appear equally in the respective coils. Analogous considerations apply to dimension changes resulting from temperature variations. The effect of vibration is conveniently eliminated by designing the torque sensitive ring assembly so that it has a critical frequency well above the range of torque pulsations at the crank shaft or other drive shaft, or gear tooth frequencies introduced from gear train assemblies which may form part of the drive assembly to which the torque sensitive device is attached. The design problem here is not great because of the inherent rigidity of the torque sensitive assembly.

It is apparent from the foregoing that the specific rotor construction disclosed provides a measurable reduction in the necessary gauge length of shaft to obtain a given electrical unbalance of the coils of the stationary member. This represents a measurable improvement in the type of device illustrated in Fig. 1, since in many applications space limitations are such that available shaft gauge lengths will not ordinarily provide the necessary torsional strains. For this reason, any reduction in required gauge length which produces no reduction in sensitivity, represents an important improvement. In addition the combination of the strain-sensitive or responsive devices illustrated with dynamometer ratio types of indicating instruments as described provides an inherent stability and as follows a low sensitivity to unwanted electrical changes in a degree hitherto unobtainable.

The foregoing disclosure and the showings made in the drawings are merely illustrative of the principles of this invention and are not to be interpreted in a limiting sense, the only limitations are to be determined from the scope of the appended claims.

I claim as my invention:

1. In a magnetic device, the combination of, a rotor member including a pair of axially displaced and relatively rotatable rings, at least one finger member connected to one of said rings and axially extending between said rings, a segment non-magnetically supported by said ring in circumferentially displaced relationship to said finger member, an axially extending finger member connected to the other of said rings and disposed between said one finger member and said segment such that airgaps are formed therebetween, a stationary member disposed with respect to the rings and segments of the rotor member such that airgaps of constant magnetic characteristic are formed whether the rotor member is rotating or stationary, means for producing a magnetic flux linking the stationary member and rotor member across said airgaps, said finger members and segment cooperating upon relative rotation of said rings to alter the distribution of the magnetic flux linking said members.

2. In a magnetic device, the combination of, a rotor member including a pair of axially displaced and relatively rotatable rings, finger members alternately connected to said rings and axially extending therebetween, a plurality of segments alternately non-magnetically connected to said rings and each disposed in proximity to a finger member of the opposite rings, a stationary member having portions thereof disposed in proximity to said rings and said segments of said rotor member such that air gaps of constant magnetic characteristic are formed therebetween whether the rotor is rotating or stationary, means for producing a magnetic flux linking the stationary member and the rotor member across said airgaps, said finger members and said segments cooperating upon relative rotation of said rings to alter the distribution of the magnetic flux linking the stationary member and the rotor member.

3. An electromagnetic device comprising, in combination, a member of magnetizable material including a pair of axially displaced and relatively rotatable rings, projections on said rings extending axially therebetween, segments disposed between said rings, each segment being non-magnetically supported by one of said rings and disposed in proximity to a projection on the other of said rings such that a circumferential airgap is formed therebetween, means including a pair of windings for producing magnetic flux linking said member and said windings, said magnetic flux following paths through said member including said rings, projections and segments, said projections on said rings and said segments cooperating upon relative rotation of said rings to vary the circumferential airgaps therebetween to change the distribution of the magnetic flux in said member thereby changing the magnetic flux linkage of the member and the windings.

4. In a device for measuring the torque of a shaft, the combination of, a rotor member including a pair of axially displaced rings secured to said shaft, projections on said rings extending axially therebetween, ring segments disposed between said rings, each ring segment being non-magnetically supported by one of said rings and disposed in close proximity to a projection on the other of said rings such that a small circumferential airgap is formed therebetween, stationary means including a pair of windings for producing a magnetic flux linking said rotor member and said windings, said means being spaced from said rotor member such that airgaps of constant magnetic characteristic are formed between said means and said rings and segments of the rotor member whether the rotor member is rotating or stationary, said projections on said rings and said ring segments cooperating upon relative rotation of said rings due to torsional strain of said shaft to vary the circumferential airgaps therebetween to change the distribution of the magnetic flux in said rotor member, thereby changing the magnetic flux linkage of the rotor member and the windings, and means for determining the change in electrical properties of said windings resulting from the change in magnetic flux linkage.

5. In a device for determining the torque of a shaft, the combination of, a rotor member including a pair of axially displaced rings secured to said shaft, projections of said rings extending axially therebetween, ring segments disposed between said rings, each of said ring segments being non-magnetically supported by one of said rings, a stationary member having surfaces thereof disposed in proximity to said rings and ring segments of said rotor member such that airgaps of constant magnetic characteristic are formed therebetween whether the rotor member is rotating or stationary, said stationary member forming together with said rotor member two magnetic circuits in parallel relationship, said projections and said ring segments of the rotor member cooperating upon relative rotation of said rings due to torsional strain of said shaft to increase the reluctance of one magnetic circuit while decreasing the reluctance of the other circuit, means including a pair of windings associated with the stationary member for producing a magnetic flux linking the stationary member and rotor member across said airgaps, and means for determining the change in electrical properties of said windings upon variation of the reluctance of said magnetic circuits.

6. In a device for determining the torque of a shaft, the combination of, a rotor member for the shaft, a stationary member having portions thereof disposed in proximity to said rotor member such that airgaps of constant magnetic characteristic are formed therebetween whether the rotor member is rotating or stationary, said stationary member forming together with the rotor member two magnetic circuits in parallel relationship, which parallel magnetic circuits include said airgaps of constant magnetic characteristic, a primary winding associated with both of said magnetic circuits and supported by the stationary member, a secondary winding associated with but one of the magnetic circuits and supported by the stationary member, means for supplying an alternating current for energizing the primary winding and producing a magnetic flux linking said members across said airgaps and linking said secondary winding, means forming a part of the rotor member for altering the magnetic flux linkages in the parallel magnetic circuits in opposite directions in response to shaft torque, and means for measuring the voltage differences of the windings.

7. In a device for determining the torque of a shaft, the combination of, a rotor member for the shaft, a stationary member having portions thereof disposed in proximity to said rotor member such that airgaps of constant magnetic characteristic are formed therebetween, said stationary member forming together with the rotor member two magnetic circuits in parallel relationship, a primary winding associated with both of said magnetic circuits, a secondary winding associated with but one of the magnetic circuits, means for supplying an alternating current for energizing the primary winding and producing a magnetic flux linking said members across said airgaps and linking said secondary winding, means forming a part of the rotor member for altering the magnetic flux linkages in the parallel magnetic circuits in opposite directions in response to shaft torque, circuit means connecting a tapped portion of said primary winding in series circuit with said secondary winding such that the electrical quantities of said windings in said series circuit are equal and opposite when the shaft torque is zero, and an electrical instrument connected to respond to the unbalanced electrical quantities of said secondary winding and the tapped portion of said primary winding.

8. In a device for determining the torque of a shaft, the combination of, a rotor member for the shaft, a stationary member having portions thereof disposed in proximity to said rotor member such that airgaps of constant magnetic characteristic are formed therebetween, said stationary member forming together with the rotor member two magnetic circuits in parallel relationship, a primary winding associated with both of said magnetic circuits, a secondary winding associated with but one of the magnetic circuits, means for supplying an alternating current for energizing the primary winding and producing a magnetic flux linking said members across said airgaps and linking said secondary winding, means forming a part of the rotor member for altering the magnetic flux linkages in the parallel magnetic circuits in opposite directions in response to shaft torque, circuit means connecting a tapped portion of said primary winding in series circuit with said secondary winding such that the electrical quantities of said windings in said series circuit are equal and opposite when the shaft torque is zero, a dynamometer type of electrical instrument having a moving coil and a stationary coil, said moving coil being connected in said series circuit and said stationary coil being connected to said means for supplying an alternating current.

9. In a device for determining the torque of a shaft, the combination of, a rotor member for the shaft, a stationary member having portions thereof disposed in proximity to said rotor member such that airgaps of constant magnetic characteristic are formed therebetween, said stationary member forming together with the rotor member two magnetic circuits in parallel relationship, an exciting winding disposed to be linked by both of said magnetic circuits, a pair of secondary windings each disposed to be linked by the flux produced by the exciting winding, one secondary winding being in both of the magnetic circuits and the other secondary winding being in one of the magnetic circuits, means for supplying an alternating current for energizing the exciting winding and producing a magnetic flux linking said members across said airgaps and linking said pair of secondary windings, means forming a part of the rotor member for altering the magnetic flux linkages in opposite directions in the parallel magnetic circuits in response to shaft torque, circuit means connecting said pair of windings in series opposed relationship, and means for measuring the differential of the opposed electrical quantities induced in said pair of secondary windings.

10. In a device for determining the torque of a shaft, the combination of, a rotor member for the shaft, a stationary member having portions thereof disposed in proximity to said rotor member such that airgaps of constant magnetic characteristics are formed therebetween, said stationary member forming together with the rotor member two magnetic circuits in parallel relationship, an exciting winding disposed to be linked by both of said magnetic circuits, a pair of secondary windings disposed to be linked by the flux produced by the exciting winding, one secondary winding being in both of the magnetic circuits and the other secondary winding being in one of the magnetic circuits, means for supplying an alternating current for energizing the exciting winding and producing a magnetic flux linking said members across said airgaps and linking said pair of windings, means forming a part of the rotor member for altering the magnetic flux linkages in opposite directions in the parallel magnetic circuits in response to shaft torque, circuit means connecting said pair of windings in series opposed relationship, an electrical measuring instrument having a moving coil and a stationary coil, said moving coil being connected to be energized by the differential of the induced electrical quantities of said pair of windings, and said stationary winding being energized by said means for supplying an alternating current.

11. In a device for measuring the torque of a shaft, the combination of, a rotor member including a pair of axially displaced rings secured to said shaft, projections extending between said rings alternately connected to said rings, ring segments alternately non-magnetically connected to said rings and each disposed in proximity to a projection of the opposite ring, a stationary member having portions thereof disposed in proximity to the rings and segments of said rotor member such that airgaps of constant magnetic characteristic are formed therebetween whether the rotor member is rotating or stationary, said stationary member cooperating with said rotor member to form two magnetic circuits, a pair of windings associated with the stationary member one in each of said magnetic circuits, means for supplying an alternating current for energizing said windings and producing a magnetic flux in said magnetic circuits, linking said members across said airgaps, said projections and said ring segments of said rotor member cooperating upon relative rotational movement of said rings due to torsional strain of said shaft to increase the magnetic flux in one magnetic circuit while decreasing the magnetic flux in the other magnetic circuit, and means for measuring the differential of the electrical quantities of said coils.

12. In a device for measuring the torque of a shaft, the combination of, a rotor member including a pair of axially displaced rings secured to said shaft, projections extending between said rings alternately connected to said rings, ring segments alternately non-magnetically connected to said rings and each disposed in proximity to a projection of the opposite ring, a stationary member having portions thereof disposed in proximity to the rings and segments of said rotor member such that airgaps of constant magnetic characteristic are formed therebetween whether the rotor member is rotating or stationary, said stationary member cooperating with said rotor member to form two magnetic circuits, a pair of windings associated with the stationary member one in each of said magnetic circuits, an electrical bridge circuit, said windings being connected in adjacent legs of said bridge circuit, means for supplying an alternating current for energizing the bridge circuit and thereby the windings whereby a magnetic flux is produced in said magnetic circuits linking said members across said airgaps, said projections and said ring segments of said rotor member cooperating upon relative rotational movement of said rings due to torsional strain of said shaft to increase the magnetic flux in one magnetic circuit while decreasing the magnetic flux in the other magnetic circuit, an indicating instrument having a moving coil and a stationary coil, said moving coil being connected to be energized by the electrical unbalance of said bridge circuit and said stationary coil being connected to said means for supplying an alternating current.

FRANK W. GODSEY, JR.

REFERENCES CITED

The following references are of record in the file of this patent:

UNITED STATES PATENTS

| Number | Name | Date |
|---|---|---|
| 2,173,039 | Muir | Sept. 12, 1939 |
| 2,354,129 | Langer | July 18, 1944 |
| 2,354,130 | Langer et al. | July 18, 1944 |
| 2,365,564 | Langer | Dec. 19, 1944 |

FOREIGN PATENTS

| Number | Country | Date |
|---|---|---|
| 659,658 | France | Feb. 5, 1929 |